United States Patent
Riehl et al.

(10) Patent No.: US 10,978,908 B2
(45) Date of Patent: Apr. 13, 2021

(54) WIRELESS POWER TRANSMITTER FOR VERSATILE RECEIVER ALIGNMENT

(71) Applicants: UNIVERSITY OF FLORIDA RESEARCH FOUNDATION, INC., Gainesville, FL (US); MEDIATEK SINGAPORE PTE. LTD., Solaris (SG)

(72) Inventors: Patrick Riehl, Lynnfield, MA (US); Jenshan Lin, Gainesville, FL (US); Ron-Chi Kuo, Gainesville, FL (US)

(73) Assignees: University of Florida Research Foundation, Inc., Gainesville, FL (US); Mediatek Singapore PTE. LTD., Solaris (SG)

(*) Notice: Subject to any disclaimer, the term of this patent is extended or adjusted under 35 U.S.C. 154(b) by 0 days.

(21) Appl. No.: 16/077,239

(22) PCT Filed: Feb. 10, 2017

(86) PCT No.: PCT/US2017/017394
§ 371 (c)(1),
(2) Date: Aug. 10, 2018

(87) PCT Pub. No.: WO2017/139594
PCT Pub. Date: Aug. 17, 2017

(65) Prior Publication Data
US 2019/0052124 A1    Feb. 14, 2019

Related U.S. Application Data

(60) Provisional application No. 62/294,390, filed on Feb. 12, 2016.

(51) Int. Cl.
*H02J 50/10* (2016.01)
*H02J 50/50* (2016.01)
(Continued)

(52) U.S. Cl.
CPC .......... *H02J 50/10* (2016.02); *H02J 7/005* (2020.01); *H02J 7/025* (2013.01); *H02J 50/00* (2016.02); *H02J 50/40* (2016.02); *H02J 50/50* (2016.02)

(58) Field of Classification Search
CPC ..................................................... H02J 7/025
(Continued)

(56) References Cited

U.S. PATENT DOCUMENTS

| 5,311,973 A | 5/1994 | Tseng et al. |
| 9,143,000 B2 | 9/2015 | Leabman et al. |

(Continued)

FOREIGN PATENT DOCUMENTS

| CN | 204131156 U | 1/2015 |
| WO | 2015099914 A1 | 7/2015 |

OTHER PUBLICATIONS

P. Cong, M. Suster, N. Chaimanonart, and D. Young, "Wireless power recharging for implantable bladder pressure sensor," in Proc. IEEE Sensors, pp. 1670-1673, Oct. 2009.

(Continued)

*Primary Examiner* — Edward Tso
*Assistant Examiner* — Ahmed H Omar
(74) *Attorney, Agent, or Firm* — Thomas | Horstemeyer, LLP

(57) ABSTRACT

Various examples are provided for wireless power charging for versatile receiver positions. In one example, a three dimensional array of transmitter coils is positioned around a charging area. A control circuit causes the array of transmitter coils to generate a magnetic field that charges a device with any position and orientation in the charging area.

20 Claims, 5 Drawing Sheets

(51) Int. Cl.
*H02J 7/00* (2006.01)
*H02J 50/00* (2016.01)
*H02J 50/40* (2016.01)
*H02J 7/02* (2016.01)

(58) Field of Classification Search
USPC ........................................................ 320/108
See application file for complete search history.

(56) References Cited

U.S. PATENT DOCUMENTS

| | | | |
|---|---|---|---|
| 2013/0285606 A1* | 10/2013 | Ben-Shalom | H02J 7/045 320/108 |
| 2014/0117926 A1 | 5/2014 | Hwu et al. | |
| 2014/0184155 A1* | 7/2014 | Cha | H02J 7/025 320/109 |
| 2014/0191710 A1 | 7/2014 | van Lammeren et al. | |
| 2014/0266020 A1 | 9/2014 | van Lammeren et al. | |
| 2015/0130406 A1 | 5/2015 | Jing | |
| 2015/0326061 A1* | 11/2015 | Davison | H02J 7/0044 320/108 |
| 2015/0326063 A1 | 11/2015 | Leabman et al. | |
| 2015/0364938 A1 | 12/2015 | Lapetina et al. | |
| 2016/0064994 A1* | 3/2016 | Ku | H02J 7/025 307/104 |
| 2017/0040696 A1* | 2/2017 | Peralta | H01F 38/14 |
| 2017/0222483 A1* | 8/2017 | Feng | H02J 50/12 |
| 2017/0237296 A1* | 8/2017 | Keith | H02J 7/0042 307/104 |

OTHER PUBLICATIONS

R. Tseng et al, "Introduction to the Alliance for Wireless Power loosely-coupled wireless power transfer system specification version 1.0," in Proc. IEEE WPTC, May 2013.

M. Kiani et al, "Design and optimization of a 3-coil inductive link for efficient wireless power transmission," IEEE Trans. Biomed. Circuits Syst., vol. 5, No. 6, pp. 579-591, Dec. 2011.

J. Jadidian and D. Katabi, "Magnetic MIMO: How to charge your phone in your pocket," in Proc. Int. Conf. Mobile Computing Networking, pp. 495-506, Sep. 2014.

P. Riehl, et al, "Wireless power systems for mobile devices supporting inductive and resonant operating modes," IEEE Trans. Microwave Theory Techniques, vol. 63, No. 3, pp. 780-790, Mar. 2015.

J. Kim, D. Kim, K. Kim, and Y. Park, "Free-positioning wireless charging system for hearing aids using a bowl-shaped transmitting coil," in Proc. IEEE WPTC, pp. 60-63, May 2014.

E. Waffenschmidt and T. Staring, "Limitation of inductive power transfer for consumer applications," in Proc. IEEE European Conf. Power Electronics Applications, pp. 1-10, Sep. 2009.

H. Lang, A. Ludwig, and C. Sarris, "Magnetic near-field focusing and optimal wireless power transfer," in Proc. IEEE WPTC, May 2015.

J.Choi et al, "Design of high efficiency wireless charging pad based on magnetic resonance coupling," in Proc. 42nd European Microwave Conf., pp. 916-919, Nov. 2012.

R. Kuo, P. Riehl, A. Satyamoorthy, B. Plumb, P.Tustin, and J. Lin, "A 3D resonant wireless charger for a wearable device and a mobile phone," in Proc. IEEE WPTC, May 2015.

B. Choi, E. Lee, Y. Sohn, G. Jang, and C. Rim, "Six degree of freedom mobile inductive power transfer by crossed dipole Tx and Rx coils," IEEE Trans. Power Electronics, vol. 31, No. 4, pp. 3252-3272, Nov. 2015.

\* cited by examiner

WIRELESS POWER TRANSMITTER FOR VERSATILE RECEIVER ALIGNMENT

CROSS-REFERENCE TO RELATED APPLICATION

This application is the 35 U.S.C. § 371 national stage application of PCT Application No. PCT/US2017/017394, filed Feb. 10, 2017, which claims priority to, and the benefit of, U.S. provisional application entitled, "Wireless Power Transmitter with Enhanced Spatial Freedom," having Ser. No. 62/294,390, filed Feb. 12, 2016, both of which are herein incorporated by reference in their entireties.

BACKGROUND

In order to achieve fast charging at high efficiency, wireless chargers for mobile devices require high coupling from transmitter to receiver coils. Because of this, these wireless chargers typically operate using close alignment of transmitter to receiver. This limits the design possibilities of wireless chargers to mostly planar structures such as charging pads. However, planar or specific alignment structures are not always optimal, and can cause user inconvenience. For example, it can be difficult or inconvenient to naturally place wearable devices on a planar charging pad. In some popular structures such as charging pads, the positioning can be limited to a specific x-y-z translation and a minimum tilt. These conventional configurations ignore the rise in the popularity and number of wearable devices, and other innovative products with different shapes, sizes and power level requirements. In addition, more and more customers seek the convenience of charging multiple devices simultaneously without paying special attention to their placement in the charging structure. Therefore, the design of wireless charging systems that maintain the power transfer efficiency while improving the user experience has become an important topic of research.

SUMMARY

In various embodiments, wireless power transmitter systems, apparatus and methods of use thereof are provided. Among the various embodiments is a wireless charging system. The system can include a three-dimensional (3D) coil array and control circuitry configured to adjust a magnetic field generated by the 3D coil array based upon positioning of a device being charged by the wireless charging system. For example, the device can be a smart phone or a smart watch.

In one or more aspects, the device to be charged can be positioned within a charging area surrounded by the 3D coil array. In some cases, the device can be supported by an insert disposed within the 3D coil array.

In one or more aspects, a 3D coil array of the wireless charging system can include coils distributed about a vertical structure. In some cases, the vertical structure can have a geometric shape. For example, the geometric shape can be a cylindrical shape.

In one or more aspects, the control circuitry can be configured to detect a presence of the device within the 3D coil array. In some examples the system can include a ferrite sheet surrounding the 3D coil array.

Further embodiments can include a wireless power charging apparatus. In one or more aspects, the wireless power charging apparatus can include a charging structure comprising at least one vertical wall, where the at least one vertical wall surrounds a charging area of the charging structure. An array of transmitter coils comprising first and second transmitter coils can be positioned along the at least one vertical wall. A control circuit can separately activate individual coils of the array of transmitter coils to generate a magnetic field configured to couple with a receiver coil of a device positioned in the charging area regardless of orientation of the device in the charging area. The first transmitter coil can be activated by the control circuit to direct at least a portion of the magnetic field into the charging area through the first transmitter coil, and the second transmitter coil can be activated by the control circuit to direct at least a portion of the magnetic field out of the charging area through the second transmitter coil.

In one or more aspects, a transmitter coil of the array can be activated by the control circuit to direct a magnetic flux vector of the magnetic field into the charging area through the first transmitter coil. Another transmitter coil of the array can also be activated by the control circuit to direct another magnetic flux vector of the magnetic field out of the charging area through the other transmitter coil. A device that has a receiver coil can be in the charging area and can be charged regardless of a position and an orientation of the device. In other embodiments the magnetic field can be generated based on the position and the orientation of the device.

In one or more aspects, the control circuit can activate one transmitter coil to have a one hundred eighty degree input signal phase difference from another transmitter coil in the array. For example, the first and the second transmitter coils can be activated with a one hundred eighty degree phase difference. In various embodiments the transmitter coil that directs the first magnetic flux vector of the magnetic field into the charging area through the first transmitter coil can be adjacent to the other transmitter coil that directs the other magnetic flux vector of the magnetic field into the charging area through the other transmitter coil. For instance, the first transmitter coil can be adjacent to the second transmitter coil.

In one or more aspects, the array of transmitter coils can be evenly spaced about the at least one vertical wall. The control circuit can separately control a subset of the array of transmitter coils including the first and second transmitter coils to generate a rotating magnetic field in the charging area. The charging area can be a cylindrical area defined by the at least one vertical wall.

In one or more aspects, the charging structure can comprise a base of the charging area, where the at least one vertical wall surrounds the charging area above the base. The wireless power charging apparatus can comprise a transmitter coil in the base. The wireless power charging apparatus can comprise a ferrite sheet that surrounds the at least one vertical wall.

Other systems, methods, features, and advantages of the wireless power transmitter systems and methods of use thereof will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1A:
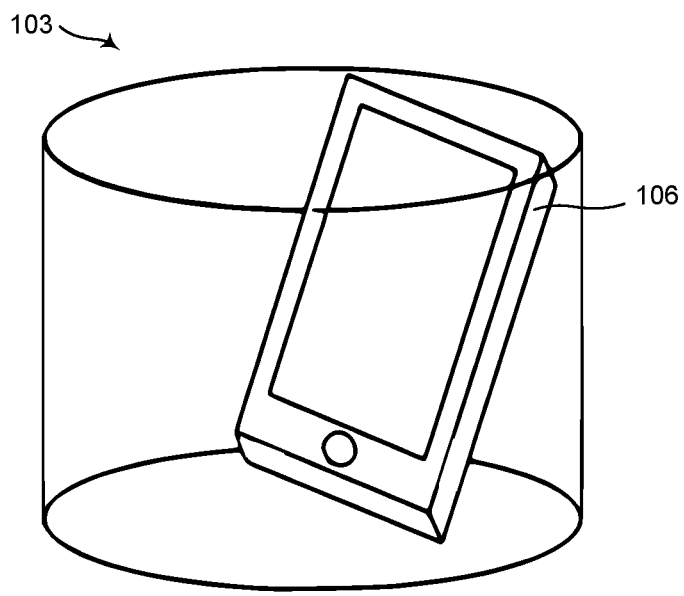
FIGS. 1A-1B are illustrations of an example wireless power transmitter according to the present disclosure.

Disclosed herein are various examples related to wireless power transmitters for versatile receiver positions. Wireless power transmission according to the present disclosure can enhance spatial freedom of the position of the receiver device. Existing wireless charging products are mostly planar, and do not have much freedom in alignment of receiver vs. transmitter coils. Planar structures are not always optimal. This disclosure presents a three-dimensional (3D) wireless charging system that allows for a much higher degree of freedom when placing a device with a receiver in the wireless charging system. A user can arbitrarily place the device (e.g., a mobile device such as smart phone, tablet, or other portable device) inside the 3D wireless charging system, which can enable and optimize charging of the arbitrarily placed device through amplitude and phase control of a transmitter coil array. An array of transmitter coils can be arranged around a 3D charging volume to allow charging of mobile or other devices at a wide range of orientations within that volume. The 3D wireless charging system can include circuitry that allows the coils to be selectively activated with individual phase and/or amplitude relationships in order to improve or optimize the charging of the device. Examples of the 3D wireless charging system describe a vertical structure with a cylindrical shape, however other geometric shapes (e.g., rectangular, hexagonal, octagonal, etc.) can be utilized.

For example, it can be advantageous to design a non-planar in-vehicle charger using, e.g., the cup holder as a wireless charger. A mobile device (e.g., smart phone) may be placed in the cup holder for charging. The wireless charging system can detect the presence of the device and adjust excitation of the coil array to improve and/or optimize the charging. Additionally, wearable devices such as, e.g., smart watches or monitoring devices may not be designed to be naturally placed on a planar charging pad. In some implementations, the 3D wireless charging system can include a stand or support to hold the wearable device within the wireless charging system during charging. In other embodiments, the wearable device may be positioned over and/or around the coil array for charging. In some cases, an insert or support can be positioned within the coil array to hold the device in position to improve coupling of the magnetic field.

A 3D wireless charging system can successfully minimize or eliminate blind spots in its interior area by controlling both the coil arrangement and the phase of its individual input signals. Moreover, the charger's six degrees of freedom (DoF) of positioning presents sufficient resonant coupling independently of the type or the shape of the device being charged. Such a charger can also be compliant with the AirFuel Alliance specification, i.e., it can, in some embodiments, support multiple devices up to 10 W simultaneously at the operating frequency of 6.78 MHz. Higher and lower wattages and higher and lower operating frequencies can also be achieved.

To generate sufficient and uniform magnetic field density inside a volume, the shape and the arrangement of the transmitter coil need to be considered. A charging structure with multiple transmitter coils aligned substantially equally along a vertical wall of a cylindrical charging structure can provide an example arrangement. Other shapes can also be used, for example a wall of a charging structure can also form an interior volume or area that is a triangular prism, rectangular prism, pentagonal prism, or other prism. A number of the transmitter coils, n, can be determined in consideration of the size of the charger, the number of the supporting devices, and the type of the receiving devices. The dimension of a transmitter coil can be designed to be about 1.5-2 times larger than the receiving coil to improve the leakage of the magnetic flux. In other cases, a ratio of transmitter coil size to receiving coil size can be greater and/or lesser, e.g., in a range about 1.5-2.5, 1.25-2.5, or 1.25-3. A piece of ferrite material can be used to surround the charger. For example, a flexible ferrite sheet can be used around the walls of the charger. Such a ferrite sheet can channel the magnetic flux back to the transmitter coil. It can also improve the electromagnetic interference from other electronic systems in the environment.

In one example, the size of a charging structure can be designed to be about 10 cm in height and about 12 cm in diameter, and the thickness of the sidewall can be about 4 mm. Each transmitter coil cell can be fabricated by winding 16-gauge wire about 4 mm apart. In one embodiment, an inductance value and quality value for each cell can be about 1.71 pH and about 260.07, respectively.

The magnetic field generated by each transmitter coil can be represented by phase and amplitude, as a phasor expression or flux vector. To create a volume with arbitrary spatial freedom of placement, an omni-directional magnetic flux can be generated. Amplitude of the magnetic field for sufficient coupling at a center of the area can also be achieved.

Magnetic field vectors can have a rotational effect that can enable the receiving coil to receive the power in any direction. The receiving coil can receive the power when placed with any orientation within the area of the charger. A six-coil configuration can be used as an example to explain the principles of the present disclosure. Fewer transmitter coils can be used, or more transmitter coils can be made with the principles disclosed herein.

In one example controlling methodology, transmitter coils can be activated with either a phase difference of 0° or 180° to couple the magnetic flux into the receiver coil. The controlling circuit can also be configured to activate particular ones of the transmitter coils of the charger with the 0° or 180° input phase depending on the position and/or orientation of the receiver coil(s). In some cases, all of the transmitter coils of the charger can be used, and in other cases, a subset of the transmitter coils of the charger can be used to achieve a particular magnetic field pattern that can maximize coupling with the receiver coil(s). In some cases, the activation state (e.g., on or off), and the input phase (e.g., 0° or 180°) when activated can be continually rotated or changed in a particular pattern such that any orientation of a receiver coil within the area of the charger can be charged. The controlling circuit can also be optimized for multiple devices.

In one embodiment, among others, the receiver coil can have an area of about 29×31 mm² in a substantially square shape. Other shapes and sizes can be achieved. A receiver coil can, for example, be in a wearable device or another electronic device. To reduce the interference from other metallic components in the wearable device, a piece of ferrite sheet can be attached to the back of the receiver coil. To demonstrate the six degrees of freedom of positioning, a receiver coil with different orientations and/or positions can be measured.

With reference to the figures, shown in FIG. 1A is a charging structure 103. A device 106 is shown within a charging area surrounded by a vertical wall of the charging structure 103. The device 106 can be charged regardless of the position and orientation of the device 106 in the charging area. The charging structure 103 can transmit power wirelessly, and can also be referred to as a wireless power transmitter. As shown, the charging structure 103 can be substantially cylindrical in shape. In other words, the charging area can be contained or surrounded by the substantially vertical wall of the charging structure 103. While the charging structure 103 is shown with a single, continuous vertical wall around the cylindrical charging area, in other embodiments the charging structure 103 can have multiple walls that form a charging area having another geometric shape with respect to the interior of its wall(s). Examples of the 3D wireless charging system can include wall(s) that form a cylindrical prism, triangular prism, rectangular prism, hexagonal prism, octagonal prism, ovoidal prism, and the like. The base below the charging area can be attached to the wall(s), and the base can include a transmitter coil.

Figure 1B:
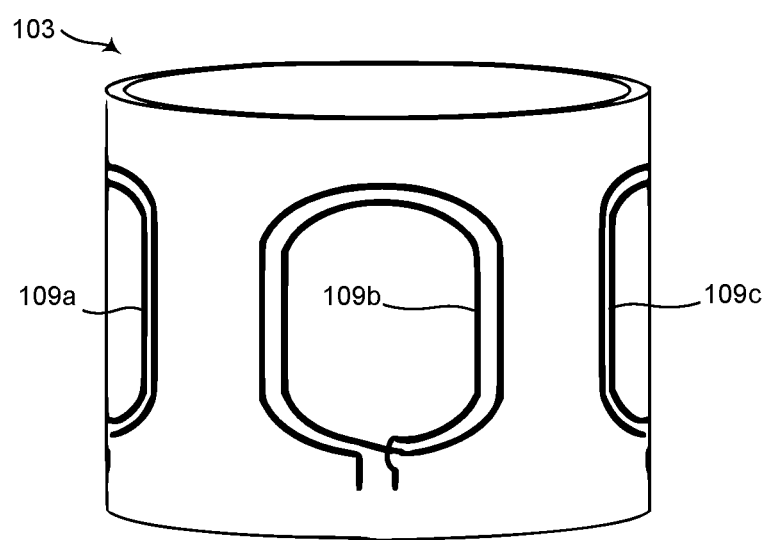

FIG. 1B shows an example of the charging structure 103. The charging structure 103 can include an array of transmitter coils including transmitter coils (e.g., 109a, . . . 109n). While three transmitter coils 109a, 109b and 109c are shown in FIG. 1B, one or more additional transmitter coils 109 can be in the array of transmitter coils. In some cases, the transmitter coils 109 can be substantially evenly spaced in the vertical wall of the charging structure. As shown, each of the transmitter coils 109a-c can have a different orientation or face a different direction about the interior charging area of the charging structure 103. In the various embodiments, each of the transmitter coils 109a-c can be independently controlled by a control system of the charging structure 103. In other words, a different signal can be selectively applied (or no signal can be applied) to each of the transmitter coils 109a-c. Each signal can have a different phase. For example, the signals applied to each of the transmitter coils 109a-c can be either a sinusoidal power signal or a similar sinusoidal power signal that differs in phase by 180°.

In some cases, each of the signals or each of a subset of the signals applied to the various transmitter coils of the array can be based on the same signal. For instance, the phase can be shifted (e.g., by 180°) when applied to the transmitter coil 109a, but not shifted (or shifted by 0°) when applied to the transmitter coil 109b. Other phase shifts are possible. In some cases, the phase shifted signals can be used to make an oscillating or rotating magnetic field.

Figure 2:
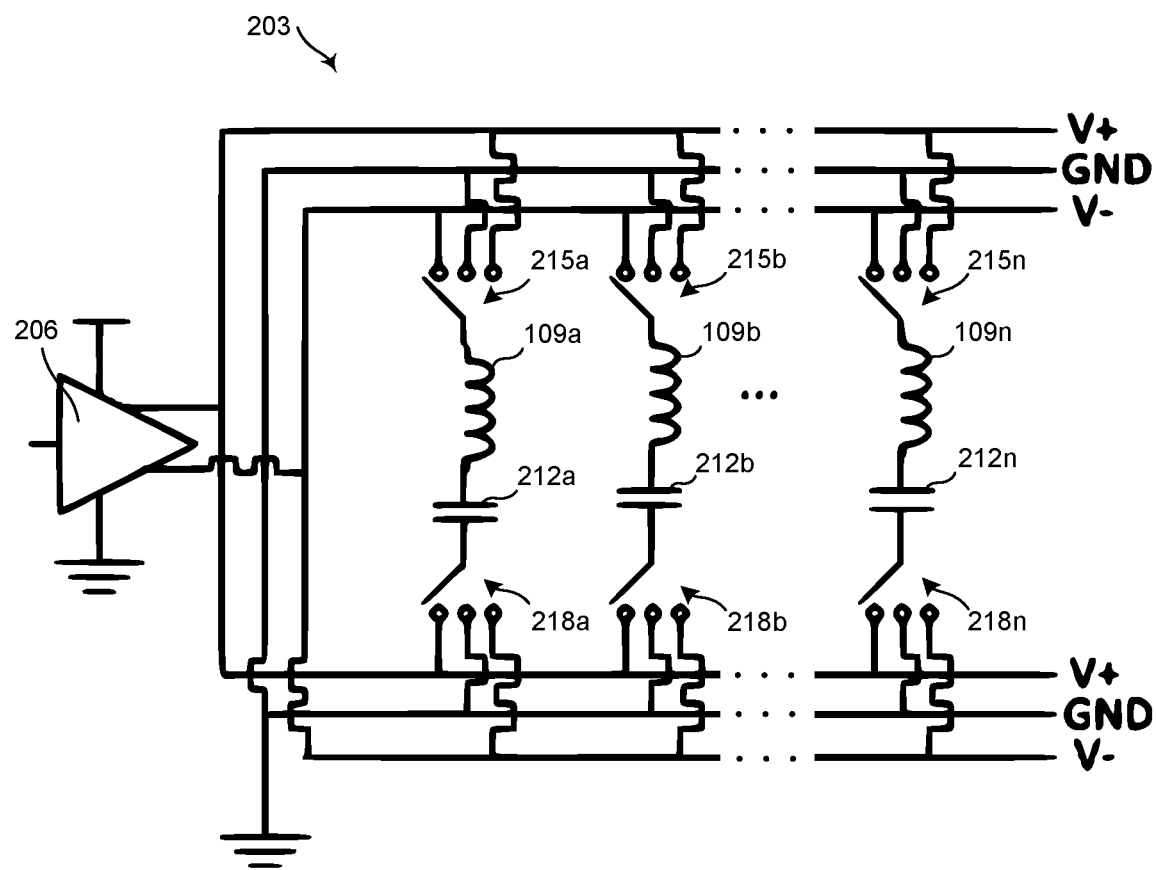
FIG. 2 is an illustration of an example circuit diagram for a wireless power transmitter according to the present disclosure.

FIG. 2 shows an example of a circuit diagram of a control circuit 203 for a wireless power transmitter or charging structure 103 according to various embodiments of the present disclosure. An amplifier 206 can drive the transmitter coils 109a-109n. In some embodiments a matching capacitor 212a can be connected in series with the transmitter coil 109a, a matching capacitor 212b can be connected in series with the transmitter coil 109b, and so on for the transmitter coils 109a-109n. Three-position switches 215a and 218a can be used to selectively connect and disconnect the transmitter coil 109a. The switches 215a and 218a can be used to drive a signal through the transmitter coil 109a with current flowing in either direction. For example, the signal can be shifted by 0° or 180°. This can be accomplished by applying voltage (V+ or V−) through switch 215a or through switch 218a while the other switch is connected to ground (GND). In other implementations, other combinations of the switch positions shown can be used.

By controlling the voltage applied across transmitter the coil 109, the amount of magnetic flux produced by that coil can be controlled. In the example of FIG. 2, the voltage applied across the coil 109 and capacitor 212 can be 2V (V+ to V− or V− to V+), V (V+ to GND, GND to V+, GND to V− or V− to GND) or 0 volts. Each of the transmitter coils 109a-109n can be selectively and independently controlled in a similar manner. The selection can be made to maximize coupling for a particular position and/or orientation of a device in a charging area of a charging structure, or can be made to create an omni-directional magnetic field. By controlling the voltage phase and amplitude applied to the transmitter coils through the switches, the direction and/or rotation of the aggregate magnetic flux in the charging area can be controlled.

An omni-directional magnetic field can provide a magnetic field with sufficient flux through a receiver coil of a device at any position and/or orientation to charge the device. By selectively and independently controlling the connected voltage across the transmitter coils, the current flowing through each transmitter coil can be directed in same or opposite directions. Therefore, according to the Ampere's Law, magnetic flux vectors can be produced that are directed into or out of the charging area depending on the current direction in the transmitter coil. Combining the magnetic flux vectors generated from each transmitter coil, the aggregate magnetic field can be manipulated in omni-directions and rotating with time.

Based on the number of transmitter coils 109a-n and their relative positions, an activation pattern can be applied by the control circuit 203 to the various transmitter coils 109a-n. Among the various embodiments, the activation pattern can, for example, change periodically, manually, or in response to a detected position and/or orientation of the device 106 (FIG. 1A) in the charging area. In some embodiments, a set of activation patterns can be cycled periodically to allow for charging of a device at any orientation.

Figure 3A:
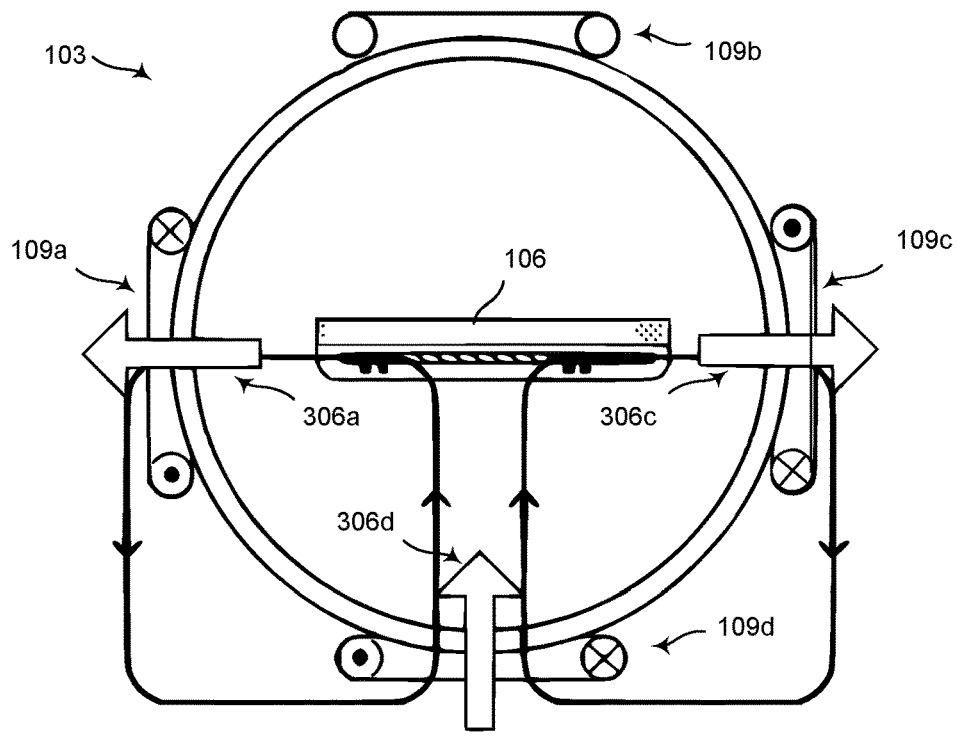
FIGS. 3A-3B are illustrations of top views of an example wireless power transmitter according to the present disclosure.

FIG. 3A shows a top view of an example of a charging structure 103 including transmitter coils 109a-d. A device 106 can be positioned in the charging area of the charging structure 103. Transmitter coils 109a-d can be positioned around the charging area, for example, along a wall of the charging structure 103. This view shows an activation pattern being applied to the transmitter coils 109a-d to generate a magnetic field in the charging area with sufficient flux density to charge the device 106 using a receiver coil in the device.

As shown, the transmitter coil 109*a* can be activated to direct the magnetic field out of the charging area through the transmitter coil 109*a* as indicated by the magnetic flux vector 306*a*. The transmitter coil 109*a* can generate the magnetic field based on the signal applied by a control circuit (e.g., 203 of FIG. 2) with a particular phase and amplitude selection as described. In this case, the magnetic field directs magnetic flux out of the charging area substantially normal to the wall at the center of the transmitter coil 109*a*. In other activation patterns, the transmitter coil 109*a* can direct magnetic flux into the charging area substantially normal to the wall at the center of the transmitter coil 109*a*, or the transmitter coil 109*a* can be turned off, or not activated.

As shown, the transmitter coil 109*c* can be activated to direct the magnetic field out of the charging area through the transmitter coil 109*c* as indicated by the magnetic flux vector 306*c*. The transmitter coil 109*c* can generate a magnetic field based on the signal applied by a control circuit (e.g., 203 of FIG. 2) with a particular phase and amplitude selection as described. In this case, the magnetic field directs magnetic flux out of the charging area substantially normal to the wall at the center of the transmitter coil 109*c*. In other activation patterns, the transmitter coil 109*c* can be activated to direct magnetic flux into the charging area substantially normal to the wall at the center of the transmitter coil 109*c*, or the transmitter coil 109*c* can be turned off, or not activated.

As shown, the transmitter coil 109*d* can be activated to direct the magnetic field into the charging area through the transmitter coil 109*d* as indicated by the magnetic flux vector 306*d*. The transmitter coil 109*d* can generate a magnetic field based on a signal applied by a control circuit (e.g., 203 of FIG. 2) with a particular phase and amplitude selection as described. In this case, the magnetic field can be activated to direct magnetic flux into the charging area substantially normal to the wall at the center of the transmitter coil 109*d*. In other activation patterns, the transmitter coil 109*d* can direct magnetic flux into the charging area substantially normal to the wall at the center of the transmitter coil 109*d*, or the transmitter coil 109*d* can be turned off, or not activated.

As shown, the transmitter coil 109*b* can be off or not activated, but can alternatively be activated by a control circuit (e.g., 203 of FIG. 2) to direct magnetic flux into or out of the charging area through the transmitter coil 109*b*.

Figure 3B:
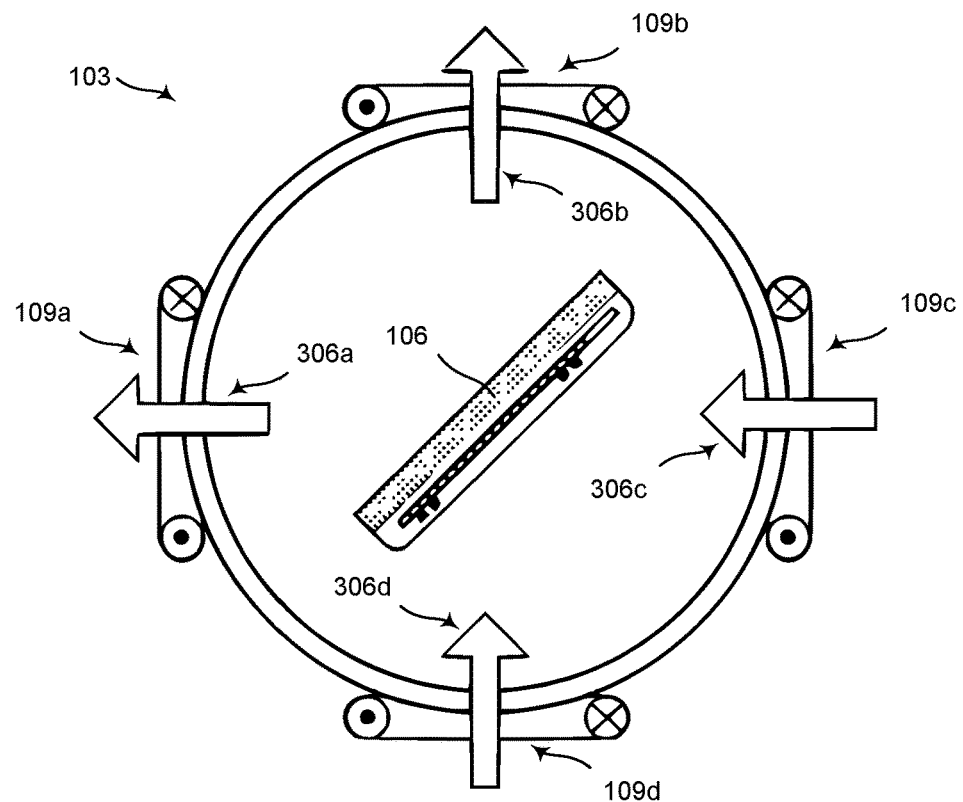

FIG. 3B shows a top view of an example of the charging structure 103 with a different activation pattern than that shown in FIG. 3A. The device 106 to be charged has a different orientation than that shown in FIG. 3A. The activation pattern shown can, for example, more effectively charge the device 106 in the orientation shown by directing a resultant magnetic field from the activation pattern shown. Accordingly, a flux density through a receiver coil of the device 106 can be improved by choosing or designing the activation pattern.

The transmitter coils 109*a* and 109*d* can operate in a manner similar to that discussed above for FIG. 3A. In this example, however, the transmitter coil 109*c* can direct flux into the charging area through the transmitter coil 109*c* rather than out of the charging area. As shown, the transmitter coil 109*c* can be activated to direct the magnetic field into the charging area through the transmitter coil 109*c* as indicated by the reversed magnetic flux vector 306*c*. The transmitter coil 109*d* can generate a magnetic field based on a signal applied by the control circuit (e.g., 203 of FIG. 2) with a particular phase and amplitude selection.

Also, the transmitter coil 109*b* can be activated to direct the magnetic field out of the charging area through the transmitter coil 109*b* as indicated by the magnetic flux vector 306*c*. The transmitter coil 109*b* can generate a magnetic field based on a signal applied by the control circuit (e.g., 203 of FIG. 2) with a particular phase and amplitude selection.

Figure 4A:
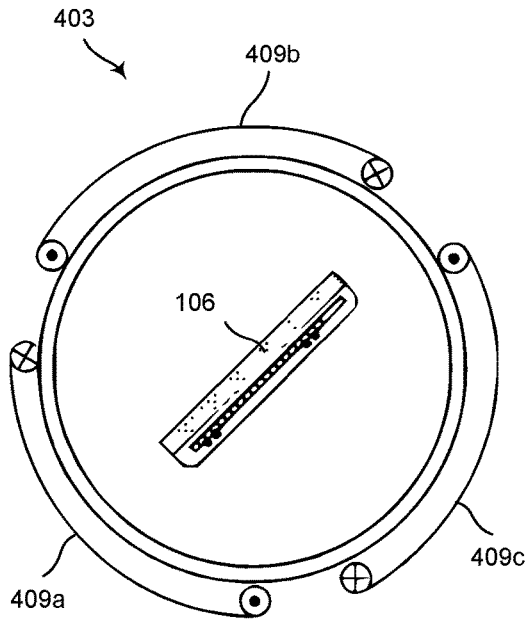
FIGS. 4A-4D are illustrations of top views of example wireless power transmitters according to the present disclosure.

FIGS. 4A-4D illustrate that various charging structures can have any number of transmitter coils according to the principles disclosed herein. FIG. 4A shows a charging structure 403 having an array of three transmitter coils 409*a-c*. A device 106 can be in the charging area of the charging structure 403, surrounded by the array of transmitter coils 409*a-c*. In this example, each of the transmitter coils 409*a-c* can have a bent or curved shape that conforms to the curve of the vertical wall of the charging structure 403. In other situations the transmitter coils 409*a-c* can be more planar and the vertical walls can be thick enough or otherwise shaped to accommodate the transmitter coils. In other embodiments the vertical walls can also substantially form a triangular prism and the transmitter coils 409*a-c* can be more planar. A control circuit (e.g., 203 of FIG. 2) can selectively control each of the transmitter coils 409*a-c* as discussed herein, in consideration of the particular configuration of the coils.

Figure 4B:
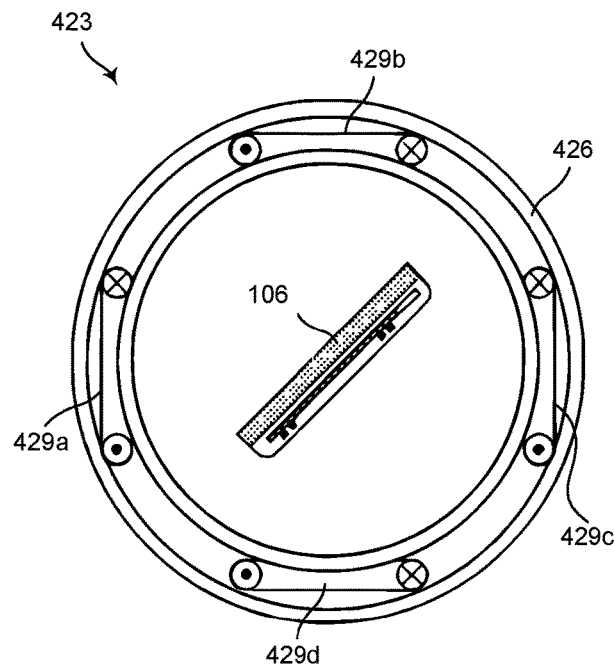

FIG. 4B shows a charging structure 423 having an array of four transmitter coils 429*a-d*. A device 106 can be in the charging area of the charging structure 423, surrounded by the array of transmitter coils 429*a-d*. A ferrite sheet 426 can surround the array of transmitter coils 429*a-d*. A control circuit (e.g., 203 of FIG. 2) can selectively control each of the transmitter coils 429*a-d* D as discussed herein, in consideration of the particular configuration of the coils.

Figure 4C:
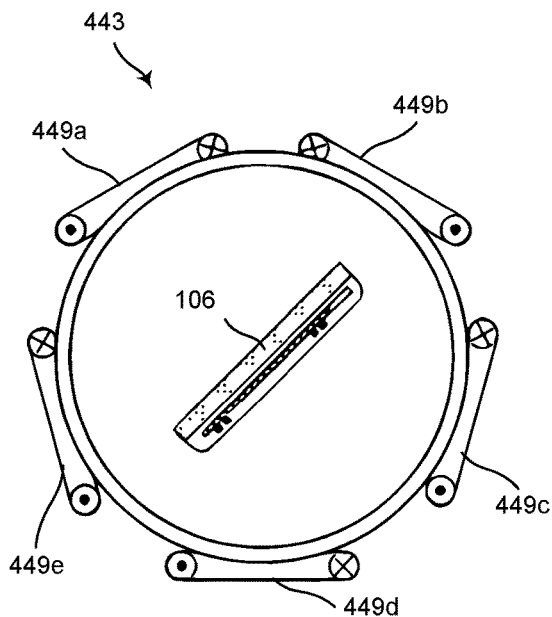

FIG. 4C shows a charging structure 443 having an array of five transmitter coils 449*a-e*. A device 106 can be in the charging area of the charging structure 443, surrounded by the array of transmitter coils 449*a-e*. A control circuit (e.g., 203 of FIG. 2) can selectively control each of the transmitter coils 449*a-e* as discussed herein, in consideration of the particular configuration of the coils.

Figure 4D:
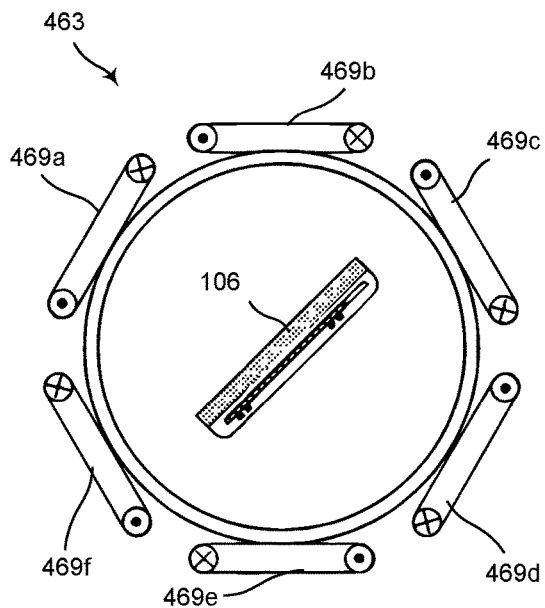

FIG. 4D shows a charging structure 463 having an array of six transmitter coils 469*a-f*. A device 106 can be in the charging area of the charging structure 463, surrounded by the array of transmitter coils 469*a-f*. A control circuit (e.g., 203 of FIG. 2) can selectively control each of the transmitter coils 469*a-f* as discussed herein, in consideration of the particular configuration of the coils.

Figure 5:
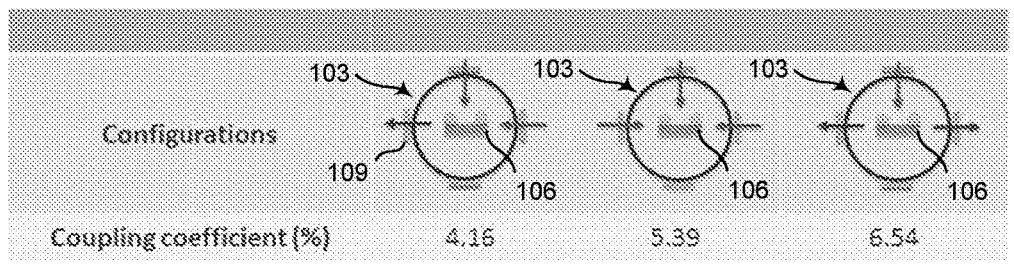
FIG. 5 is a table that illustrates example coupling coefficients for configurations of an example wireless power transmitter according to the present disclosure.

FIG. 5 shows a table that illustrates an example of coupling coefficients for configurations or activation patterns of a wireless power transmitter charging structure 103 according to various embodiments of the present disclosure. The orientation of a device 106 in the charging area is also shown. Using a 4-coil cylindrical charging structure 103, it can be seen that the coupling coefficient can vary depending on the phase relationship of the transmitter coils 109. In this situation, the coils 109 can be used to direct the forward flux through the receiver coil of the device 106 by directing flux into the charging area through one or more transmitter coil(s) 109, and to direct the return flux from the receive coil out of the charging area through one or more other transmitter coil(s) 109, thereby resulting in higher coupling coefficients.

Figure 6:
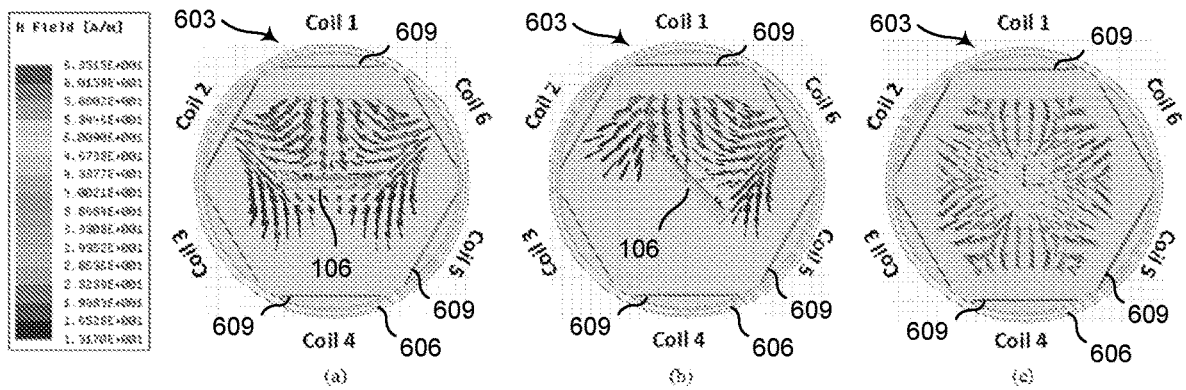
FIG. 6 is an illustration that shows example magnetic fields for configurations of an example wireless power transmitter according to the present disclosure.

FIG. 6 shows examples of magnetic fields corresponding to various activation patterns of a wireless power transmitter charging structure 603 having six coils 609. A rotating magnetic field can be produced by the principles disclosed herein. Different transmitter coils 609 can be activated depending on the orientation of the receiver coil of a device 106 in the charging area. Notably, a high permeability material, for instance, a ferrite sheet 606 surrounding the structure can be used. In part (a) of FIG. 6, the receiver coil of a device 106 can be aligned to the center of a transmitter coil 609, which is "Coil 1" in this illustration. In this example, only three coils 609 are activated with "Coil 2," "Coil 1" and "Coil 6" having input phases equal to 180°, 0° and 180°, respectively. In this example, the 0° input phase corresponds to generating a magnetic field through "Coil 1" with a flux vector pointing into the charging area through "Coil 1." Accordingly, "Coil 1" can direct the magnetic flux into the center of the receiver coil of the device 106. In this example, the 180° input phase corresponds to generating a magnetic field through each of "Coil 2" and "Coil 6" with the flux vectors pointing out of the charging area through "Coil 2" and "Coil 6." Accordingly, "Coil 2" and "Coil 6" can direct the magnetic flux out of the sides of the receiver coil of the device 106. Therefore, the opposite input phases of adjacent transmitter coils can establish the forward path and the return path of the flux. Moreover, with the varying sinusoidal input power through "Coil 2," "Coil 1" and "Coil 6," a rotating magnetic field with steady flux paths can be created. From part (a) of FIG. 6, it can be observed that the normal vectors of the H field can be generated towards to the receiver coil at center position with an enhanced flux density.

In part (b) of FIG. 6, another possible orientation of a device 106 is shown where the receiver coil can be aligned to the area between two adjacent coils. In this example, "Coil 1" and "Coil 6" is activated with 0° and 180° input phases, respectively. The flux path can be established with only two coils activated. The coil to coil efficiency can be improved by minimizing the number of activated transmitter coils.

In part (c) of FIG. 6, another orientation of a device 106 is shown where the receiver coil is lying at the bottom of the structure 603. By adjusting the number of activated transmitter coils 609 with the same input phase, the receiver coil can achieve sufficient magnetic coupling to charge the device 106. Moreover, a planar spiral coil can be added to the bottom of the structure to enhance the flux density if needed.

Figure 7:
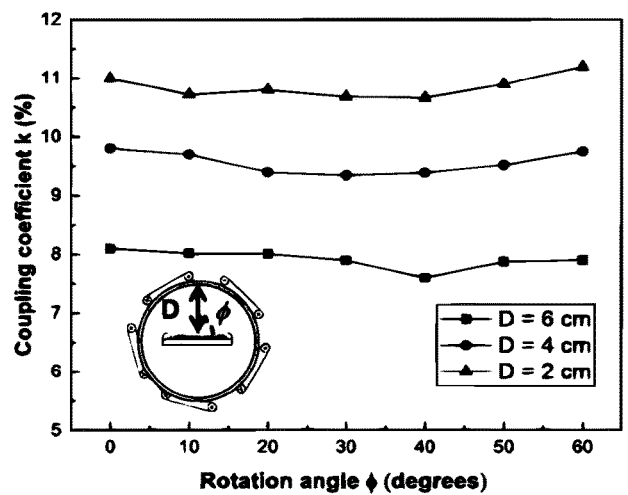
FIG. 7 is an illustration that shows an example graph of coupling coefficients as a function of receiver positions, according to the present disclosure.

FIG. 7 shows a graph illustrating examples of coupling coefficients as a function of receiver position in the charging area of a charging structure 443 with five coils 449 (FIG. 4C), according to various embodiments of the present disclosure. An average coupling coefficient that is larger than 7.6% can be achieved, while freedom of rotation in the φ direction is possible as shown by the plots. The coupling coefficients for various distances D to the wall of the charging structure 443 are also illustrated in FIG. 7, where D is the distance between transmitter and receiver coils with a fixed radius for the structure 443. About 3% coupling coefficient variation was seen for the freedom of translation or position. From FIG. 7, an average coupling coefficient of 7.6%, disregarding the rotation and translation, can be achieved. In some cases, the coupling coefficient of the receiver coil can be higher than 13% at the center position. The overall coupling coefficient can be improved about 2% by adding the flexible ferrite sheet outside the structure 443.

As has been presented, a 3D structure allowing positioning with six degrees of freedom can be achieved using the principles disclosed herein. By adjusting the phase and/or amplitude of the input signal to each transmitter coil, an omni-directional magnetic field can be made to charge a receiver coil at different orientations. Coupling coefficients of 7.6% and greater can be achieved and dead-zones within the charger can be successfully eliminated. Furthermore, resonant coupling can be improved using the ferrite sheet to surround the charger.

It should be emphasized that the described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It can be to be understood that such a range format can be used for convenience and brevity, and thus, should be interpreted in a flexible manner to include not only the numerical values explicitly recited as the limits of the range, but also to include all the individual numerical values or sub-ranges encompassed within that range as if each numerical value and sub-range can be explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. A wireless charging system, comprising:
a three-dimensional (3D) coil array comprising a plurality of coils; and
control circuitry configured to change at least one magnetic field vector of a magnetic field generated by the 3D coil array over time according to an activation pattern to charge a device within the 3D coil array regardless of an orientation of the device being charged by the wireless charging system,
wherein the activation pattern activates, using a power signal, a selected coil selected from the plurality of coils to direct a magnetic field vector into an interior of the 3D coil array for a first period of time while a plurality of transmitter coils laterally adjacent to the selected coil are activated using a one-hundred-eighty-degree phase-shifted version of the power signal to direct corresponding magnetic field vectors to an exterior of the 3D coil array, and wherein the activation pattern changes the at least one magnetic field vector over time by changing the selected coil to another one of the plurality of coils for a second period of time.

2. The wireless charging system of claim 1, wherein the 3D coil array comprises the plurality of coils distributed about a vertical structure.

3. The wireless charging system of claim 2, wherein the vertical structure has a geometric shape.

4. The wireless charging system of claim 3, wherein the geometric shape is a cylindrical shape.

5. The wireless charging system of claim 1, wherein the device is positioned within a charging area surrounded by the 3D coil array.

6. The wireless charging system of claim 5, wherein the device is supported by an insert disposed within the 3D coil array.

7. The wireless charging system of claim 5, wherein the control circuitry is configured to detect a presence of the device within the 3D coil array.

8. The wireless charging system of claim 1, wherein the device comprises a smart phone or a smart watch.

9. The wireless charging system of claim 1, comprising a ferrite sheet surrounding the 3D coil array.

10. A wireless power charging apparatus, comprising:
a charging structure comprising at least one vertical wall, where the at least one vertical wall surrounds a charging area of the charging structure; and
an array of transmitter coils positioned along the at least one vertical wall;
a control circuit that separately activates individual coils of the array of transmitter coils to generate a changing magnetic field configured to change at least one magnetic field vector over time according to an activation pattern to charge a device positioned in the charging area regardless of orientation of the device,
wherein the activation pattern activates, using a power signal, a selected transmitter coil selected from the array of transmitter coils to direct a magnetic field vector into an interior of the charging structure for a first period of time while a plurality of transmitter coils laterally adjacent to the selected transmitter coil are activated using a one-hundred-eighty-degree phase-shifted version of the power signal to direct corresponding magnetic field vectors to an exterior of the charging structure, and wherein the activation pattern changes the at least one magnetic field vector over time by changing the selected transmitter coil to another one of the array of transmitter coils for a second period of time.

11. The wireless power charging apparatus of claim 10, wherein the array of transmitter coils are activated using a circuit comprising an amplifier and a plurality of three-position switch pairs, wherein individual ones of the three-position switch pairs correspond to individual ones of the transmitter coils.

12. The wireless power charging apparatus of claim 11, wherein the individual ones of the plurality of three-position switch pairs activate the individual ones of the transmitter coils using a designated one of the power signal or the one-hundred-eighty-degree phase-shifted version of the power signal.

13. The wireless power charging apparatus of claim 10, wherein the array of transmitter coils are evenly spaced about the at least one vertical wall.

14. The wireless power charging apparatus of claim 10, wherein the control circuit separately controls a first subset of the array of transmitter coils for the first period of time, and controls a second subset of the array of transmitter coils for the second period of time to generate the changing magnetic field in the charging area.

15. The wireless power charging apparatus of claim 10, wherein the charging area is a cylindrical area defined by the at least one vertical wall.

16. The wireless power charging apparatus of claim 10, wherein the charging structure comprises a base of the charging area, where the at least one vertical wall surrounds the charging area above the base.

17. The wireless power charging apparatus of claim 16, further comprising a transmitter coil in the base.

18. The wireless power charging apparatus of claim 10, further comprising a ferrite sheet that surrounds the at least one vertical wall.

19. A method, comprising:
configuring a control circuit of a three-dimensional (3D) coil array to control the 3D coil array according to an activation pattern; and
generating, by the 3D coil array, a changing magnetic field that changes at least one magnetic field vector over time according to the activation pattern wherein the activation pattern activates, using a power signal, a selected coil selected from a plurality of coils of the 3D coil array to direct a magnetic field vector into an interior of the 3D coil array for a first period of time while a set of at least one transmitter coil laterally adjacent to the selected coil is activated using a one-hundred-eighty-degree phase-shifted version of the power signal to direct corresponding magnetic field vectors to an exterior of the of the 3D coil array, and wherein the activation pattern changes the at least one magnetic field vector over time by changing the selected coil to another one of the plurality of coils for a second period of time.

20. The method of claim 19, wherein the activation pattern indicates activation of a first subset of transmitter coils of the 3D coil array for the first period of time, and activation of a second subset of transmitter coils of the 3D coil array for the second period of time to generate the changing magnetic field.

* * * * *